United States Patent [19]

Doyle

[11] Patent Number: 4,556,316
[45] Date of Patent: Dec. 3, 1985

[54] INTERFEROMETER SPECTROMETER HAVING SIMPLIFIED SCANNING MOTION CONTROL

[75] Inventor: Walter M. Doyle, Laguna Beach, Calif.

[73] Assignee: Laser Precision Corporation, Utica, N.Y.

[21] Appl. No.: 470,936

[22] Filed: Mar. 1, 1983

[51] Int. Cl.$^4$ ................................................. G01B 9/02
[52] U.S. Cl. ..................................................... 356/346
[58] Field of Search ........................................ 356/346

[56] References Cited

U.S. PATENT DOCUMENTS 3,936,193 2/1976 Auth ..................................... 356/346
4,383,762 5/1983 Burkert ................................ 356/346

OTHER PUBLICATIONS

Kemp et al., "Rocket-Borne Cryogenic Interferometer Spectrometer Used for an Artificial Auroral Measurement", *Proc. SPIE*, vol. 245, pp. 34-42, 1980.

Primary Examiner—Davis L. Willis
Assistant Examiner—Matthew W. Koren
Attorney, Agent, or Firm—Thomas J. Plante

[57] ABSTRACT

A spectrometer is disclosed having an interferometer in which: (a) the variable-length arm has a moving retroreflector (copy A to A in summary). The pivoted linkage comprises three or more arms each having its upper end pivotally connected to a supporting structure and its lower end pivotally connected to a carrier for the retroreflector. The stationary folding mirror blocks approximately half of the open face of the retroreflector, causing the radiation which enters the unblocked half of the retroreflector to be reflected back to the retroreflector after it has traveled diagonally across the retroreflector and then been reflected toward the folding mirror.

8 Claims, 6 Drawing Figures

INTERFEROMETER SPECTROMETER HAVING SIMPLIFIED SCANNING MOTION CONTROL

BACKGROUND OF THE INVENTION

This invention relates to spectrometers of the type which, (a) incorporate interferometers in which spectral scanning is accomplished by varying the path length of radiation in one interferometer arm, and (b) use the Fourier Transform performed by a computer to convert electronic signals derived from the optical output of the interferometer into spectral analysis data.

Changing the length of one interferometer arm requires motion, either of a reflector which constitutes the end of the variable length arm, or of a refractive element interposed in the variable length arm. Controlling such motion is a difficult and expensive procedure, because it must be very uniform in order to produce reliable scanning data. Any lack of smoothness in the motion will interfere with the data output.

Generally, the solution for this problem, in high peformance spectrometers, has been the use of air bearings to support the moving element. The substantial cost of air bearings and their related structures has been unwelcome, and has prompted numerous efforts to find less expensive types of bearings. Sliding bearings have not been successful because of their tendency toward "stickiness", and ball bearings have not provided sufficiently smooth and linear motion. The use of oil is to be avoided because of the susceptibility of the instruments to contamination.

The foregoing considerations tend to limit the non-air-bearing possibilities to point, or pivotal, bearings rather than surface bearings. Such constructions have been proposed, e.g., a "parallelogram" linkage arrangement for supporting a moving reflector during its spectral scanning motion. However, for a variety of reasons, the systems proposed thus far have not been commercially successful. The problems caused by undesired tilting or shearing movement of the moving reflector have not been adequately solved. Also, the use of a parallelogram linkage creates a limitation on the width of the scan, because it tends to limit the permissible motion of the moving reflector, and thus limit the available path length variation of the analytical beam.

Furthermore, as discussed at length in Doyle Application Ser. No. 470,937, filed Mar. 1, 1983, the problem of incorporating a reference beam which signals the start of each analytical scan has not been adequately resolved. Interferometers of the type under discussion generally incorporate three radiation sub-systems: (1) the infrared (IR) radiation which is the basic analytical beam; (2) a monochromatic (laser) beam which derives pulses from a periodic fringe pattern to "clock" the sampling of detector signals by the computer system; and (3) a wide-band, or "white" light beam which is used to start each spectral scanning sweep at the identical point in the spectrum, in order that the integrated spectral data output will have maximum accuracy. Alignment of the various interferometer optics and radiation beams requires extreme accuracy. One of the major problems is any undesired change of position of an optical element which has the effect of altering the phase relationship between the white light which produces the scanning reference point and the infrared light which produces the spectral analysis data.

SUMMARY OF THE INVENTION

The present invention provides a spectrometer in which: (a) the variable path in the interferometer is controlled by a moving reflector supported on a pivoted linkage, rather than an air bearing; and (b) the problems which would otherwise inhere in such a system are solved by using a retroreflector as the moving reflector and by combining it with a stationary mirror which has a "folding" effect on part of the radiation reaching the retroreflector. This arrangement compensates for the limited distance of movement permitted by the linkage support, prevents accidental optical errors due either to "shear" caused by lateral movement of the reflector or to tilting movement of the reflector, and provides a spectrally offset reference point which is substantially immune to shifting relative to the interferogram of the analytical beam. The driving force during scanning is provided by a linear electro-magnetic motor, which inherently maintains a substantially constant driving force because of the uniform flux field in the air gap. However, the moving component should have very limited translatory motion with respect to its non-moving component, because enlargement of the air gap would reduce motor effectiveness.

DETAILED DESCRIPTION OF PREFERRED EMBODIMENT

Figure 1:
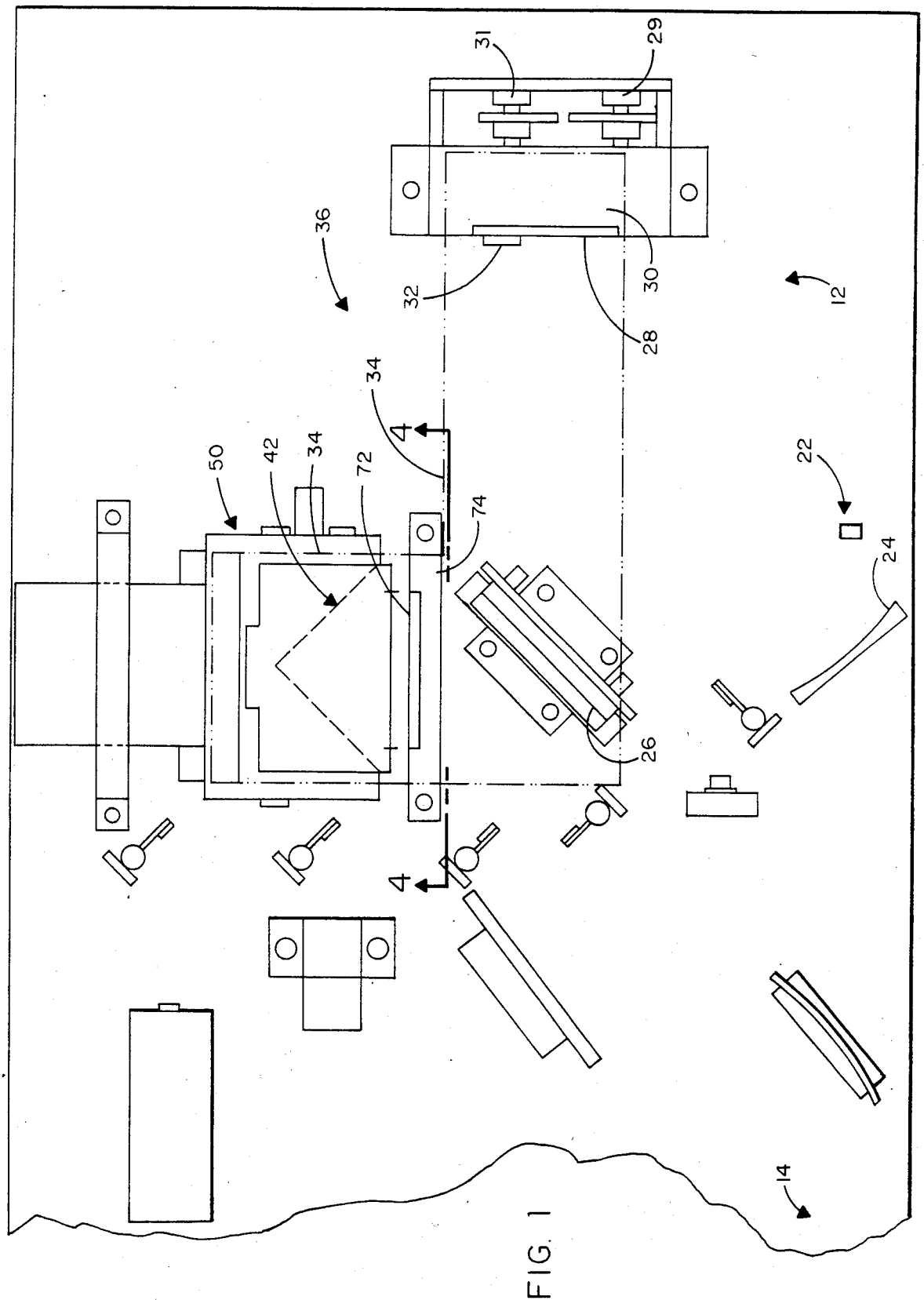
FIG. 1 is a plan view of an experimental physical embodiment of the present invention.
Figure 6:
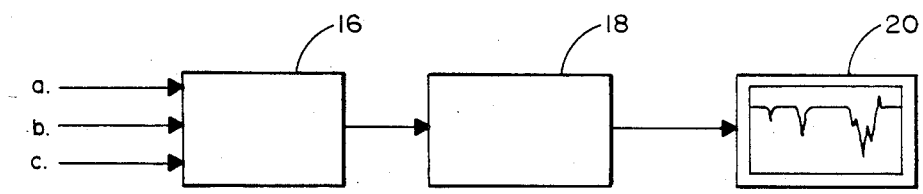
FIG. 6 is a greatly simplified diagrammatic showing of the electronic circuitry into which the interferogram outputs of the IR, white light, and laser detectors are fed.

FIG. 1, which is similar to FIG. 6 of Doyle Application Ser. No. 470,937, shows an interferometer structure, generally indicated at 12, and a sample region, generally indicated at 14, which are parts of a spectrometer system. Such a system also includes the electronics output elements shown in FIG. 6, including a fast Fourier Transform (FFT) processor 16, which receives the analytical interferogram signal from the infrared detector on lead "a", the reference interferogram signal from the white light detector on line "b", and the laser clock signal from the laser detector on line "c". The output of FFT processor 16 is input to central processor 18, and a display terminal 20 is operated from central processor 18.

The present application is concerned with the interferometer structure, and primarily with the means for providing spectral scanning data by varying the effective length of the variable-length arm of the interferometer, while the effective length of its other arm remains unchanged.

A source of radiation 22 provides both an analytical beam (which is infrared), and a reference beam (which is broad band, i.e., white light), both beams being in collimated form in the interferometer arms. Both the analytical beam, which has a relatively large cross-section, and the reference beam, which has a small cross-section and is at the periphery of the analytical beam are directed by a paraboloid mirror 24 toward a beamsplitter, 26. The beamsplitter reflects approximately half of the radiation and transmits approximately half of the radiation of each beam. In the illustrated arrangement the beamsplitter-reflected portion of each beam is directed toward the right of the figure, along the fixed-length interferometer arm. The end of this arm is provided by flat, stationary mirrors. A relatively large flat mirror 28, which may be carried in a recess in a mirror holder 30, reflects the relatively large cross-section analytical beam. A small flat mirror 32, which may be simply a piece of flat mirrored glass (e.g., a 1 mm slide) glued to the face of large mirror 28, reflects the small reference beam. The two flat mirrors, 28 and 32, as a unit, are so mounted that their position may be initially adjusted both by motion around a horizontal axis and by motion around a vertical axis; both axes extending parallel to the plane of the mirrors 28 and 32. Adjustment knobs, 29 and 31, are each connected to the adjustably-mounted mirror 28 through a series of gears and a very low pitch threaded element which provide very accurate adjustments around the horizontal and vertical axes, respectively. The positions of mirrors 28 and 32 are "locked" together, so that there is no motion of one of the mirrors with respect to the other. The horizontal displacement of the face of mirror 28 with respect to the face of mirror 32 is used to provide the necessary offset between the reference interferogram and the analytical interferogram, which permits the peak value of the analytical interferogram to be at the desired position in the scanning sequence. This subject is discussed at length in Doyle application Ser. No. 470,937.

It is apparent in FIG. 1 that an L-shaped, flat bracing plate 34 (which is shown in phantom) overlies the optical elements of the interferometer arms. The mounting structures for the optical elements in both interferometer arms are each bolted both to the overlying plate 34 and to a large supporting platform 36. This combination of lower and upper bracing connections tends to insure against vibration-caused difficulties in the interferometer elements.

The variable-length arm of the interferometer, which in the figure receives the radiation transmitted through beamsplitter 26, is the primary consideration of the present invention. The mirror in the variable-length arm is a retroreflector 42, which is shown as a corner reflector (but could also be either a cats-eye or a roof-top retroreflector).

Figure 2:
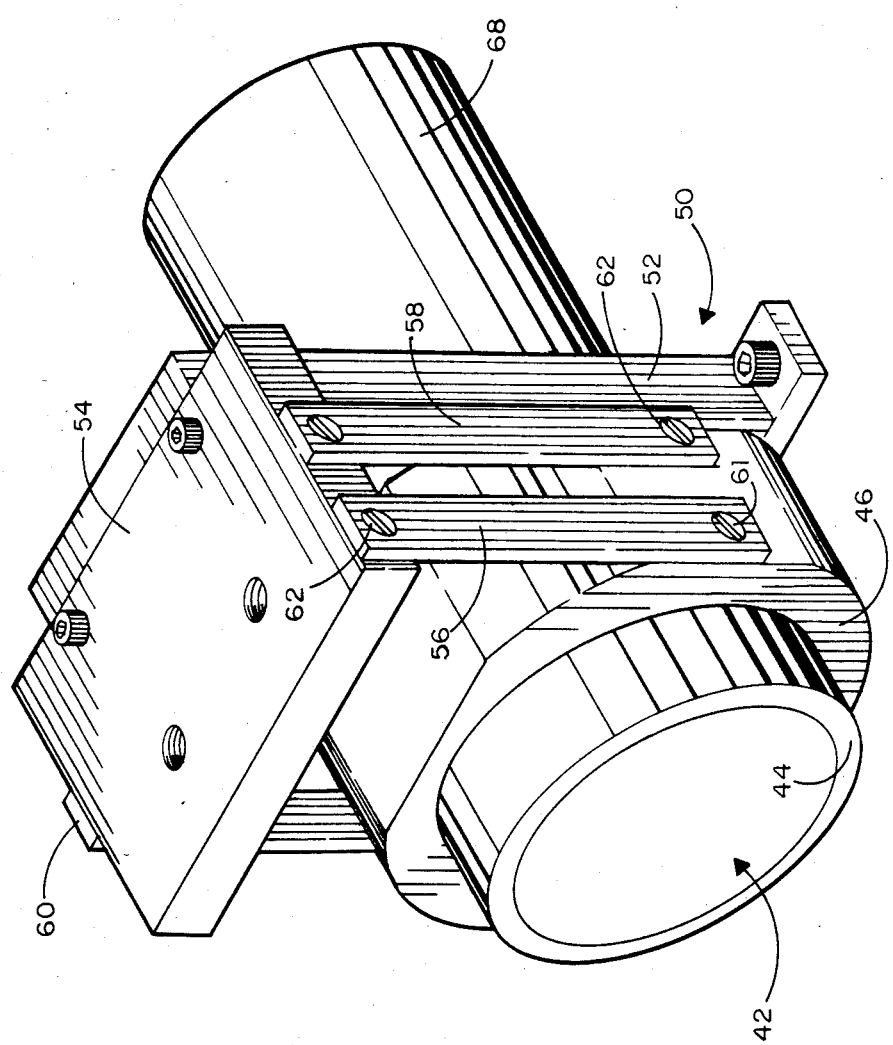
FIG. 2 is a view in perspective of the movable retroreflector and its supporting structure.
Figure 3:
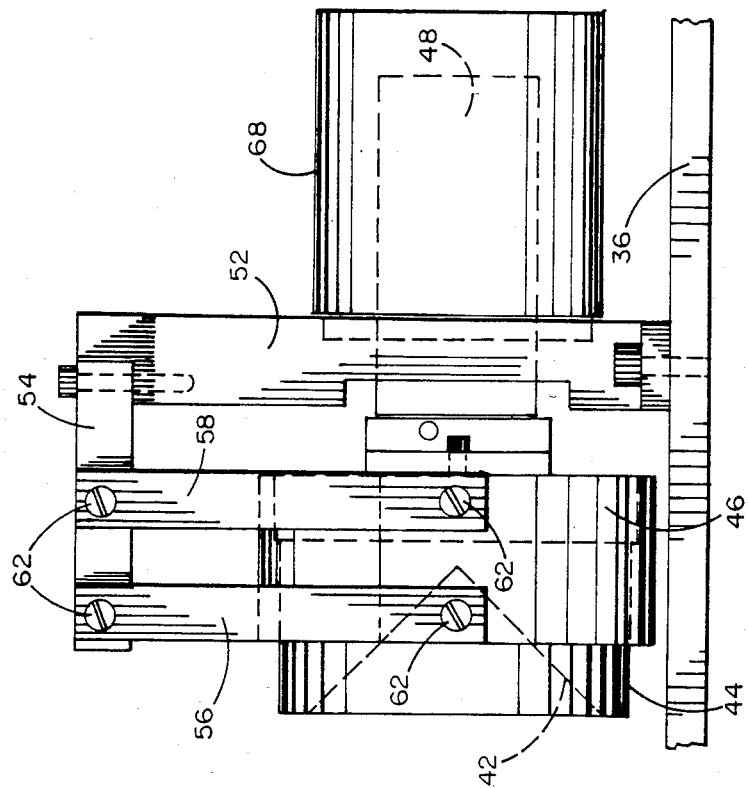
FIGS. 3 and 4 are side and front elevations, respectively, showing the movable retroreflector.
Figure 4:
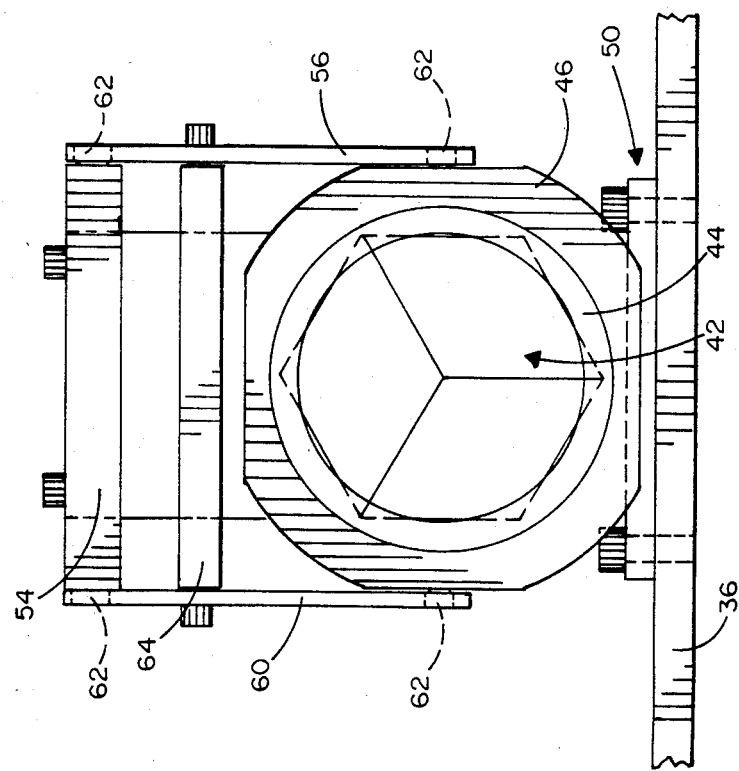

As seen most clearly in FIGS. 2-4, the retroreflector 42 is formed inside a housing 44, which is mounted in an annular carrier 46 encircling the housing. The entire retroreflector subassembly, which includes a plunger 48 of a linear electro-magnetic motor, is suspended from, and supported by, a stationary upright support 50. The support 50 is secured to both the platform 36, and the bracing plate 34, and has vertical side portions 52 and an upper horizontal plate 54.

A plurality of swing arms, which are pivotally connected at their upper ends to the horizontal plate 54 and at their lower ends to the annular carrier 46, provide support for the retroreflector subassembly, while permitting it to have reciprocating movement for scanning purposes. In the illustrated version of the invention, two swing arms 56 and 58 are shown hanging from one side of plate 54, and a single swing arm 60 is shown hanging from the other side of plate 54. Preferably each of the six pivot pins 62 located at each end of each swing is provided with a ball bearing structure to permit smooth, friction-free pivotal motion. The suggested maximum travel of the retroreflector structure is 6 mm. The use of three swing arms, rather than four or two, appears to be functionally preferable. In addition to the advantage of reduced cost for three rather than four, there is less chance of mechanical binding, and it is easier to adjust the balance of the suspension mechanism. Theoretically, two swing arms might suffice, if one was located ahead of, and the other behind, the center of gravity of the retroreflector subassembly. However, an important consideration is the use of laterally aligned arms 58 and 60, which are interconnected by a bracing link 64 (see FIG. 4). This bracing link, which moves with the swing arms, contributes significantly to the stability of the retroreflector suspension structure.

The plunger 48 of the motor which causes reciprocating motion of the retroreflector is secured by a flange to the back of annular carrier 46, and extends into motor housing 68, which is secured to the upright support 50.

Because of the pivotal movement of swing arms 56, 58 and 60 about their upper stationary pivots, there will be a slight shearing motion of the retroreflector during scanning, i.e., displacement vertically as the swing arms move away from their central precisely vertical orientation. This shearing motion of the retroreflector could cause some degradation of the interferometer output, unless compensation for shear is provided to make the apparatus shear-insensitive.

This is accomplished by using a stationary "folding" mirror in front of the lower half of the retroreflector. The folding mirror, which faces the retroreflector, receives the radiation from the retroreflector and directs it back to the retroreflector, from which it is returned to the beamsplitter.

Figure 5:
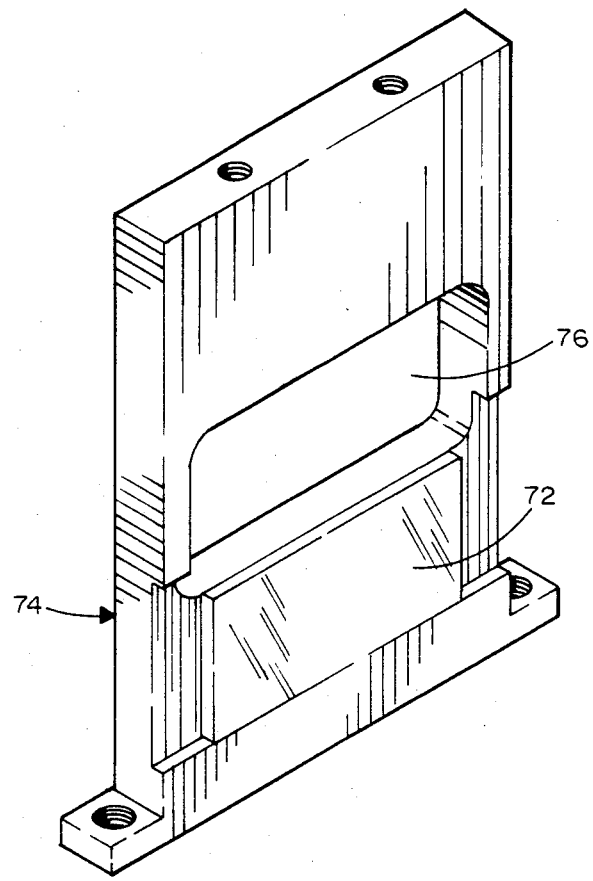
FIG. 5 is a view in perspective of the "folding" mirror and its support structure.

The folding mirror, which is indicated by the numeral 72, is seen in FIG. 1, and is shown in perspective in FIG. 5, secured to a supporting structure 74. The supporting structure 74 is adapted to be bolted to the bottom platform 36 and also to be secured to the upper bracing plate 34. An aperture 76 in the supporting structure 74 permits radiation to enter and leave the retroreflector on its way from and to the beamsplitter. Between its entering and leaving, it is reflected first diametrically across the retroreflector, then toward folding mirror 72, and by the folding mirror back to the retroreflector, after which it again is reflected diametrically across the retroreflector, before returning to the beamsplitter.

As discussed at greater length in Doyle Application Ser. No. 470,937, several advantages are derived from this "folding" effect, including a more reliable synchronization by the reference beam, and a large increase in resolution because a given increment of retroreflector travel provides a much greater differentiation between the lengths of the interferometer arms. This latter advantage is particularly important in conjunction with the pivotal supporting mechanism, i.e., the swing arm suspension, because the pivotal support limits the practical length of the scanning motion of the retroreflector.

The paths of the analytical, reference, and clock beams, which are discussed at length in Doyle Application Ser. No. 470,937, will be briefly described. The analytical (infrared) beam is provided by source 22 and is reflected by paraboloid 24 as a collimated beam which is partially reflected and partially transmitted by beamsplitter 26. The reflected portion travels along the fixed-length interferometer arm, and is reflected back by the large flat stationary mirror 28. The transmitted portion passes through the opening 76 in supporting structure 74, is reflected by the upper surface of retroreflector 42 diametrically downward to the lower surface of the retroreflector, and then is reflected toward the folding mirror 72. The folding mirror causes the beam to retrace its path in the retroreflector, and to emerge through opening 76 on its way back to the beamsplitter. The recombined beam at the beamsplitter is directed (except for the portion which goes toward the source) into the sample area 14, and after illuminating the sample, reaches a suitable detector (not shown).

The reference (broad band) beam is also provided by source 22, and directed toward beamsplitter 26 by paraboloid 24 (as a collimated beam). The reflected portion in the fixed-length arm is reflected back by small flat stationary mirror 32. The fact that the mirror 32 is secured on the face of mirror 28 provides an offset effect between the reference interferograms and the analytical interferograms. In the variable-length arm, the transmitted reference beam follows a path parallel to the analytical beam, going in and out of the retroreflector 42 through opening 76, and being folded back on itself by reflection between the retroreflector and folding mirror 72. Because the reference and analytical beams travel parallel paths, and are perpendicular to the stationary flat mirrors 28, 32 and 72, and because there is no possible relative path length change of the reference and analytical beams once the stationary flat mirrors have been initially adjusted and locked in place, the two beams (reference and analytical) are phase locked together. This provides extreme accuracy in synchronizing the starting points of successive analytical scans. The system is insensitive to any tilting or shearing motions of the retroreflector 42 as it moves on its scanning path.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. For use in a spectrometer having means for receiving and integrating successive analytical interferograms provided by an analytical beam, an interferometer, of the type having a fixed-length arm and a variable-length arm which is varied to cause spectral scanning, comprising:
    a supporting structure adapted to carry a moving reflector in the variable-length arm;
    a plurality of arms pivotally connected to and suspended from the supporting structure;
    a retroreflector pivotally carried by the arms;
    a linear electro-magnetic motor for causing reciprocating motion of the retroreflector; and
    a flat stationary mirror located adjacent to and facing the retroreflector, and partially blocking the open end of the retroreflector so as to receive a beam reflected by the retroreflector and to reflect that beam back to the retroreflector, thereby compensating for the shearing motion of the retroreflector as it travels, and also increasing the resolution of the interferometer for a given amount of retroreflector travel.

2. The apparatus of claim 1 wherein there are at least three arms supporting the retroreflector.

3. The apparatus of claim 2 which is so structured that two of the arms are aligned with one another on opposite sides of the retroreflector, and which also comprises a bracing link interconnecting the two aligned arms.

4. The apparatus of claim 1 which also comprises:
    a stationary flat mirror at the end of the fixed-length interferometer arm.

5. The apparatus of claim 1 which also comprises:
    a reference beam optical system which provides a reference interferogram for synchronizing the starting points of successive scans of the analytical beam.

6. The apparatus of claim 5 wherein the analytical and reference beams are provided by the same source and follow parallel paths through the interferometer.

7. The apparatus of claim 6 which also comprises:
    a first stationary flat mirror at the end of the fixed-length interferometer which reflects the analytical beam; and
    a second stationary flat mirror at the end of the fixed-length interferometer arm which reflects the reference beam;
    the second stationary flat mirror being secured to the first stationary flat mirror and having its reflecting surface parallel to but axially spaced from the reflecting surface of the first stationary flat mirror.

8. The interferometer of claim 1 which also comprises:
    ball bearings at each pivotal connection of each arm to the supporting structure and to the retroreflector.

* * * * *